United States Patent Office 2,889,218
Patented June 2, 1959

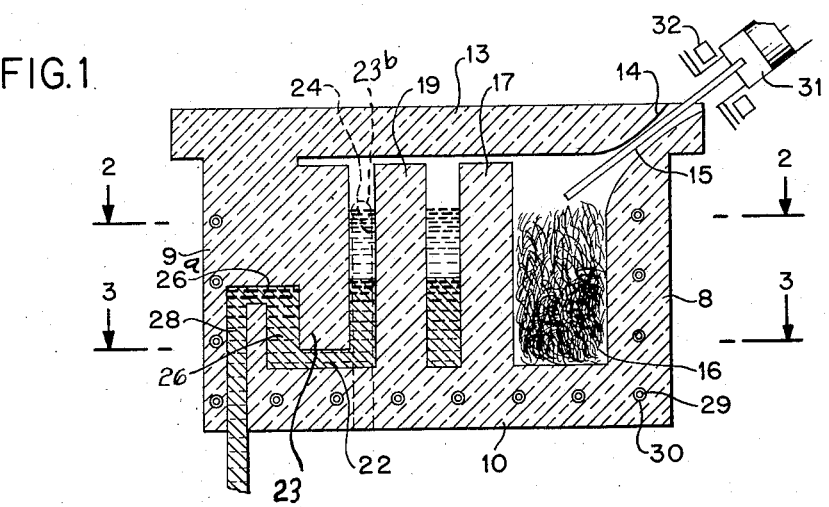
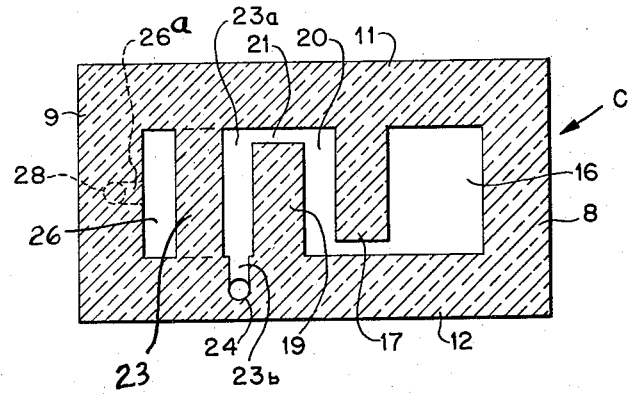
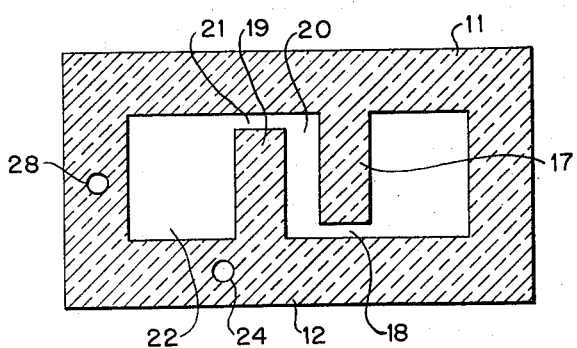

2,889,218

CONTINUOUS PROCESS FOR METALLOTHERMIC REACTIONS

Clarence F. Hiskey, Brooklyn, and Jean A. Lamoureux, New York, N.Y., assignors to Transition Metals & Chemicals, Inc., New York, N.Y., a corporation of Delaware Application April 30, 1956, Serial No. 581,343

16 Claims. (Cl. 75—27)

The principal object of the present invention is to provide a new, improved and continuous process for metallothermic reactions. For this purpose a special crucible is described which permits the continuous introduction of the metallothermic mixture and the continuous removal of slag and metal. Provision can be made in this crucible for the preheating of the reaction mixture prior to its being brought into the reaction zone and in addition provision can be made for induction heating of the crucible contents in the reaction and segregation zones. The specific details of this apparatus and process will be given after a description of the metallothermic reaction.

Metallothermic reactions are chemical reactions, exothermic in character, in which a more active metal displaces a less active one from one of its chemical compounds. The classic example of such a reaction is the displacement of iron from its magnetic oxide by aluminum, according to the following equation:

$$8\ Al + 3\ Fe_3O_4 \rightarrow 9\ Fe + 4\ Al_2O_3 + Heat$$

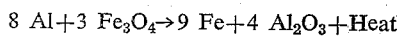

In this reaction aluminum is the more active metal which displaces the iron from its oxide. This mixture of materials, after careful blending, may be ignited by means of an ignition charge of appropriate composition. When ignited the reaction rapidly progresses through the body of the reaction mixture so that within a matter of 20–60 seconds tonnage quantities of such a mixture may be caused to react. Now, when the metal and the particular oxide are appropriately chosen, the heat of which is evolved is sufficient to raise the temperature of the whole reaction mass to more than 2500° C. This is above the melting point of both the iron and the alumina so that the reaction mass becomes liquid. Since the alumina is less dense than the iron, and since they are not mutually soluble, segregation occurs with the alumina layer floating on top of the liquid iron. By means of this process pure iron may be formed.

In the history of this process many other metals have been substituted for the aluminum, i.e., magnesium, calcium, sodium, potassium, etc., hereafter called reducing metals. Similarly, many substitutions have been made for the iron oxide, i.e. manganese oxide, chromium oxide, molybdenum oxide, tungsten oxide, vanadium oxide, niobium oxide, tantalum oxide, titanium oxide etc., hereafter called metallic oxides, and in addition other metallic salts and compounds and metallic minerals have been reduced to their metallic state by this general type of reaction. Even more illustrations might be given but those given should suffice to demonstrate the great utility of this class of reaction.

The present state of art consists in filling magnesia or other refractory crucibles with the reaction mixture, after which ignition is achieved by lighting an ignition mixture which has been placed on top of the charge. Essentially then, this method of operation produces a single batch of metal at a time.

There are many faults associated with this method of operation. In order to get a maximum yield of reduced metal, theoretical considerations indicate that both the oxide to be reduced and the active metal be as finely divided as possible. This, however, has a great disadvantage because there are likely to be variable amounts of gas-forming materials present in the reaction mixture. When the reaction commences these gaseous substances are quickly raised to very high temperatures and are ejected explosively along with molten slag and metal. As a consequence, there is great danger in operating with finely comminuted material. Even more than this is the fact that as the reactants are more finely subdivided, it is found that the rate of reaction of the mass increases. With finely atomized reducing metal and metallic oxides the reaction takes on an almose explosive character. In practice, therefore, it is customary to keep the reaction rate manageable. In our invention, fineness of particle size of the reactants, far from being a handicap, is one of the most desirable prerequisites.

A second fault of the batch process is the great thermal shock to which the crucible is subjected. In ordinary operation the crucible is at room temperature immediately prior to ignition of the reaction mass; within a half a minute after the reaction has been initiated the contents of the crucible have been raised to white heat; a minute or two later the contents of the crucible are emptied and the crucible is allowed to chill down. This rapid heating and cooling cycle produces checks and cracks in the crucible lining material and after a number of reaction processes this liner must be removed and replaced by a new one. Thus, the problem of maintenance of the crucible is an expensive and time-consuming operation.

A third fault of the batch process is the heat loss from the reaction mass occasioned by the use of a cold crucible. This chilling effect leads to freezing of some of the slag at the crucible wall and at the air interface and also causes a higher viscosity throughout the body of the slag. In the more viscous slags, the unreacted materials are less likely to diffuse and hence much of the reagents remain unreacted and therefore goes to waste. This is particularly true when reducing oxides of niobium, tantalum, titanium and zirconium. The large amount of heat lost as radiation from the top of the open crucible usually results in the solidification of the top surface of the slag.

Another fault has to do with the large size of the crucible required for tonnage production. Any crucible used in a batch reaction must be about three times larger than that required to hold the liquified material. This requirement is due to the very low bulk density of the unreacted material as contrasted with the higher density of the liquid material.

There are a great many other faults which might be adduced against batch operation, but the ones listed above are the more important to illustrate the need for a continuous process such as ours which will reduce cost and increase percentage yields of desired metals.

In the accompanying drawing illustrating one suitable form of crucible:

Fig. 1 shows in sectional side view a crucible suitable for carrying out the process of the present invention;

Fig. 2 shows a sectional top view of the same on the broken line 2—2 of Fig. 1; and Fig. 3 is a similar view on the broken line 3—3 of Fig. 1.

The crucible in the form shown comprises a bottom wall 10, a rear wall 11, a front wall 12, end walls 8 and 9, and a top wall 13. The crucible, furthermore, is formed with a baffle 17 parallel to the end walls 8 and 9 and extending from the bottom wall 10 and rear wall 11 terminating short of the front wall, thereby forming a reaction zone or chamber 16 between said baffle and end wall 8, and a passage 18 between the front edge of the baffle 17 and front wall 12. Extending from the front wall 12 and bottom wall 10, toward the rear wall 11 is a second baffle 19 parallel to the baffle 17, but terminating short of the rear wall 11, thereby forming a passage 20 between the baffles 17 and 19 and a passage 21 around the rear edge of baffle 19. Extending from end wall 9 is a baffle 23. The baffle 23 interconnects walls 11 and 12. Its lower end is spaced above the bottom wall 10, thus forming between baffles 23 and 19 a passage 23a. Between the lower end of the baffle 23 and the bottom wall 10 is formed a chamber or quiet zone 22. Extending upwardly from the chamber 22, and between the baffle 23 and the end wall 9 is a passage 26. Passsage 26 extends part of the way up and terminates well below the upper end of the baffle 23.

Extending outwardly from the upper end of passage 23 is a horizontal duct 26a from which extends downwardly to the lower end of the crucible, a duct 28. The ducts 26a and 28 are formed in the end wall 9.

Extending forwardly from the passage 23a into wall 12 is a horizontal duct 23b disposed at a higher level than the duct 26. Wall 12 is formed with a duct 24 extending downwardly from duct 23b to the underside of the crucible.

The top wall 13 is formed with an inclined through passage 14 adapted to admit a projecting rod 15 of the feed material described elsewhere herein. The feed rod 15 is shown as being molded and extruded by a die 31 as it is fed into the crucible, and may be heated as shown diagrammatically by a preheater 32 of any suitable construction. The crucible may be heated by electric induction from coils 29 which may be embedded in the walls of the crucible in openings 30.

The rod 15 reaches part way into the reaction zone 16, and comprises the reaction charge, that is, finely divided reducing metal, metallic oxide, fluxing agent, etc., preferably in stoichiometric proportion, compressed into various shapes, the preferred one being a rod of indefinite length which emanates from the extrusion die 31. This rod in turn is fed as fast as it is formed through the opening 14 in the top wall 13 of the crucible. In this crucible the metallothermic mixture reacts to produce molten metal and slag. The rod is fed in at a rate equal to or slightly in excess of the rate at which the rod would burn linearly in order to avoid burning backward. In the reaction chamber 16 where the rod is injected, a violent and turbulent reaction occurs. This reaction zone is shielded from the rest of the contents of the crucible by means of the several baffles 17 and 19 which are built as part of the walls of the crucible. After the molten material passes around the baffles through the passages 18, 20 and 21, it comes into a quiet zone 22 of the crucible where segregation of the two molten layers occurs. Two ports are provided in the wall for the continuous flow of these two layers out of the crucible. The upper port 23b, 24 is the one out of which the slag flows. By means of the manometric leg which is also part of the crucible, the separate phases flow to their designated ports. The crucible may be made of magnesia. Molten metal pours from ports 26a, 28.

Our process has been achieved in the following manner: The reaction charge, i.e. finely divided reducing metal, metallic oxide, fluxing agent, etc., is compressed into various shapes, such as rods, pellets or powder the preferred one being a rod of indefinite length which emanates from an extrusion die. This rod in turn is fed as fast as it is formed through a hole in the top of a specially constructed magnesia crucible. In this crucible, the metallothermic mixture reacts to produce molten metal and slag. The rod is fed in at a rate equal to or slightly in excess of the rate at which the rod would burn linearly in order to avoid burning backward. In the region where the reaction rod is injected a violent and turbulent reaction occurs. That reaction zone is shielded from the rest of the contents of the crucible by means of several baffles which are built as part of the walls of the crucible. After the molten material passes around the bafffles it comes into a quiet zone of the crucible where separation of the mixture into two molten layers occurs. Two ports are provided in the wall for the continuous flow of these two layers out of the crucible. The upper port is the one out of which the slag flows and the lower port is the one from which the metal phase flows. By means of a manometric leg, which is also a part of the crucible, the separated phases flow through their designated ports. After flowing from the port the metal may be cast into ingots or handled in any other desired way.

Having now described the general characteristics of our invention, it is pertinent to describe special and critical details.

In the first place, the linear rate of burning of the rods mentioned above is primarily a function of two variables and must be determined empirically for each specific charge. These variables are (a) the composition of the mixture and (b) the particle size of the components of that mixture. In other words, our experience indicates that for a given particle size the rate of burning varies with the metallic oxide to be reduced and with the reducing metal. On the other hand, for a particular composition, the rate of burning increases as the particle size decreases. For example, in one aluminum and iron oxide mixture studied, we found that by merely varying the particle size from 20 mesh to 325 mesh it was possible to increase the burning rate from one cm./sec. with the coarsest material to as much as 8 cm./sec. with the finest. Consequently in each case before starting a production run it is imperative to measure the burning rate and adjust the extrusion or feed rate to at least 25 or 50 percent faster.

The second critical item involves the start-up operation. We have found it impossible to begin metal production by using a cold crucible and igniting the rod within it. The crucibles invariably plugged because the ports became clogged with solidified slag. On the other hand, we found that heating with a burner through one of the ports, first with air and oil and finally with an oxyacetylene torch until the inside of the crucible was brought to a temperature sufficient to keep the metal and slag in a liquid state was the preferred method of starting operation. If at that temperature a rod of the metallothermic mixture is inserted into the hot crucible it immediately begins to burn. This temperature will naturally vary with each charge composition.

As the crucible fills with the molten metal and slag the manometric leg is filled. When sufficient metal has been formed so that the leg is sealed with molten metal then the slag is prevented from entering the metal leg. A small amount of slag is ejected through the metal port before any metal comes through, after which no more slag can get into that leg.

A third factor to be considered in any production is the hold-up time in the crucible. This time is determined by the crucible capacity and the feed rate. For the slower reductions this time should be made longer, with the slag kept in a very fluid condition. For the faster reductions hold-up times as short as three minutes were suitable for complete reaction. As an example, ordinary "thermit" mix was studied using a ¾-inch feed rod with a feed rate of four pounds per minute and with a hold-up time of only three minutes. In spite of this short time, it was adequate to achieve essentially stoichiometric yields. Another experiment repeated under similar conditions using ferrous columbate (columbite ore) in place of the iron oxide gave a 50% yield. When the crucible was enlarged to provide a holdup time of 5.3 minutes an 85% yield was achieved.

Finally, details of crucible preparation should be described. We have used magnesia almost exclusively to date. Since the crucibles have small capacity, usually with a hollow volume between one and ten liters, their overall dimensions are relatively small. We have used walls six inches thick which were rammed into shells made of sheet iron. After the bottom part of the crucible was rammed in, inserts for the baffles and the manometric leg were made before the sides were rammed in. The plate creating the manometric leg was arbitrarily set at ½ inch above the crucible floor. We are not restricted to this dimension, however. Next, a snug fitting magnesia cover was prepared. The port holes and the feed hole were made by inserting wooden plugs during the ramming stages and later withdrawn. The port hole for the slag is placed at least two inches below the cover while the metal port is even lower. The spacing of these holes may be made in strict accordance with the density considerations of the particular mixture being processed. This is most desirable. However, some departure from these conditions may be made and yet have the system operable. After drying with slow heat and then with high heat, the crucibles are put into operation.

Having thus summarized the details of operation we now intend to review the advantages which accrue from our process.

(a) The apparatus is very small and cheap relative to the quantities of metal made. For example, with a feed rate of 4 lb./min. one can process as much as three tons per 24 hour day in a crucible whose hold-up volume is only 12 to 15 pounds. The operation can continue until the crucible finally fails, which will take weeks.

(b) The thermal shock is avoided because the crucible can be slowly heated and once brought to operating temperature maintained there until shut down.

(c) There is no danger from explosion due to trapped gases, to products which evolve gas on thermal decomposition or because of the fineness of subdivision of the reagent material because the reacting materials are injected in comparatively small quantities and give rise to comparably smaller quantities of gases which pass freely through the ports.

(d) Temperatures very much in excess of those produced by the heat of the reaction are easily achieved by two methods which may be used in conjunction with each other or separately. For example, by preheating the rod to a temperature just under the melting point of the reducing metal we have raised the resulting temperature in the liquid metal as much as 600° C. In another experiment we embedded a water-cooled copper coil in the walls of the crucible, ramming the magnesia into a transite shell. Then by induction heating we were able to add an additional 500° C. to the melt. Indeed, with the two additional sources of heat, the temperature limit attainable is restricted only by the melting point of the crucible liner. The amount of heat added by either or both of these methods will be determined by the temperature sought and the exothermic heat of reaction of the charge.

(e) The entire operation may be made completely automatic.

While we have herein described one form in which our invention may be embodied it will be understood that the construction thereof and the arrangements of the various parts, as well as the composition of the reaction mixture, may be altered without departing from the spirit and scope thereof. Furthermore, we do not wish it to be construed as limiting our invention to the specific embodiment described, excepting as it may be limited in the appended claims.

We claim as our invention:

1. A metallothermic process for reducing metallic oxides in a continuous process, said process comprising the steps of continuously extruding a reaction mixture consisting of a reducing metal and a metallic oxide into a crucible, reacting the reducing metal and the metallic oxide therein to produce a molten metal from the metallic oxide and to form a molten slag, segregating the molten slag and molten metal in the crucible, then separating the molten slag and molten metal within the crucible and withdrawing each at separate ports situated in the crucible.

2. The process as in claim 1 and wherein the reaction mixture contains stoichiometric proportions of the reducing metal and metallic oxide.

3. The process as in claim 1 and wherein the reaction mixture is preheated after extrusion and before insertion into the crucible.

4. The process as in claim 1 and wherein the molten contents in the crucible are continuously heated.

5. The process as in claim 1 and wherein the reaction mixture is continuously fed into the crucible in the form of a rod.

6. The process as in claim 1 and wherein the reaction mixture comprises a metallic salt and a reducing metal which separate into a slag and the desired metal.

7. The process as in claim 1 and wherein the reaction mixture comprises a metallic mineral and a reducing metal which separate into a slag and a desired metal.

8. A process of continuously producing exothermically from its oxide, a metal selected from the group consisting of manganese, vanadium, niobium, tantalum, titanium, zirconium and columbium, which consists in feeding into a heated zone of a substantially closed crucible, a rod of such oxide in comminuted form admixed with a comminuted metal selected from the group consisting of metallic aluminum, magnesium, calcium, sodium and potassium, melting the end of the rod exothermically within the heated zone of the crucible to produce the desired metal and slag, flowing the molten metal around vertical baffles to produce a quiet flow, withdrawing the molten metal under a wall open below the slag level and high enough to hold molten slag at a slag overflow in the crucible wall and overflowing the molten metal separate from the slag at a metal overflow in the crucible wall.

9. The process according to the process of claim 8 in which the rod is of the order of three-fourths of an inch in diameter, and the rod is fed at the rate of about one to about eight centimeters a second and the crucible is adapted to hold its molten metal from about three minutes to over five minutes.

10. A process according to the process of claim 8 in which the rod is preheated and the crucible heated during the reaction.

11. A process according to the process of claim 8 in which the crucible is preheated to a temperature to start the reaction of metal and oxide by heating it through an outlet by an oxy-acetylene flame.

12. A metallothermic process for reducing metallic oxides in a continuous process, said process comprising continuously feeding a reaction mixture comprised of a reducing metal and a metallic oxide into a reaction zone of a crucible, causing the reaction to take place in the reaction zone, thereby forming a molten metal from the metallic oxide and forming a molten oxide of the reducing metal, allowing the molten metal and molten oxide to flow around baffles out of said reaction zone, in the crucible, allowing the molten metal and molten oxide to flow from around the baffles to a quiet zone in the crucible, permitting segregation of the molten metal and the molten oxide in said quiet zone, and then withdrawing the molten metal and molten oxide separately, manometrically, from the quiet zone of the crucible.

13. The process of claim 12 in combination with the step of preheating the reaction mixture as it is fed to said reaction zone and before insertion into the crucible.

14. The process of claim 13 in combination with the step of heating the crucible continuously.

15. The process of claim 12, said reaction mixture being in stoichiometric proportions.

16. The process of claim 12, said reaction mixture being in stoichiometric proportions and in rod shape.

References Cited in the file of this patent

UNITED STATES PATENTS

| Number | Name | Date |
|---|---|---|
| 705,727 | Weber | July 29, 1902 |
| 802,941 | Rossi | Oct. 24, 1905 |
| 821,189 | Potter | May 22, 1906 |
| 1,593,660 | Lubonsky | July 27, 1926 |
| 1,609,970 | Schroeder | Dec. 7, 1926 |
| 1,886,937 | Brett | Nov. 8, 1932 |
| 2,124,262 | Samuelson et al. | July 19, 1938 |
| 2,610,911 | Udy | Sept. 16, 1952 |
| 2,621,916 | Murphy | Dec. 16, 1952 |